May 20, 1952 J. A. ZNAIDUKAS 2,597,424

ANTENNA ORIENTATION CONTROL

Filed Nov. 15, 1949 2 SHEETS—SHEET 1

INVENTOR.
John A. Znaidukas
BY
Harry Langsam
Attorney

May 20, 1952 J. A. ZNAIDUKAS 2,597,424

ANTENNA ORIENTATION CONTROL

Filed Nov. 15, 1949 2 SHEETS—SHEET 2

INVENTOR.
John A. Znaidukas
BY
Harry Langsam
Attorney

Patented May 20, 1952 2,597,424

UNITED STATES PATENT OFFICE 2,597,424

ANTENNA ORIENTATION CONTROL

John A. Znaidukas, Philadelphia, Pa., assignor of one-half to Thomas P. Welsh

Application November 15, 1949, Serial No. 127,309

1 Claim. (Cl. 343—100)

My invention relates to control apparatus for pointing directional antennas toward the signal source, and relates particularly to a photo-electric control which is responsive to the signal received.

In the reception of radio and television signals, it is desirable to orient the antenna in the direction of maximum signal pickup. At present, motor-rotated antennas are available, whereby the operator may orient the antenna by merely connecting the motor until the antenna points in the best direction. In receiving radio signals, the operator determines the best direction of the antenna by watching the "S" meter of the communication receiver for maximum indication. The "S" meter is an instrument which measures the A. V. C. automatic voltage control voltage of the receiver, the A. V. C. voltage being proportional to the strength of the signal received.

In receiving television programs, the operator of the receiving set rotates the antenna until the best picture appears upon the viewing screen.

An object of my invention is to provide a control which automatically rotates the antenna to the best direction in the manner ordinarily performed by the operator.

Another object of my invention is to provide a control of the described nature which is responsive to the strength of the received signal.

Another object of my invention is to provide a control which may be set to operate at any predetermined value of signal strength, and which is easily attached to the receiver.

Other objects of my invention are to provide an improved device of the character described, that is easily and economically produced, which is sturdy in construction, and which is highly efficient in operation.

With the above and related objects in view, my invention consists in the details of construction and combination of parts as will be more fully understood from the following description, when read in conjunction with the accompanying drawings in which.

Referring now to the drawings, wherein similar reference characters designate similar parts, I show a system for receiving radio or television broadcasts, and which may also find use as an aid in navigation.

Figures 1, 2, 3, 4:
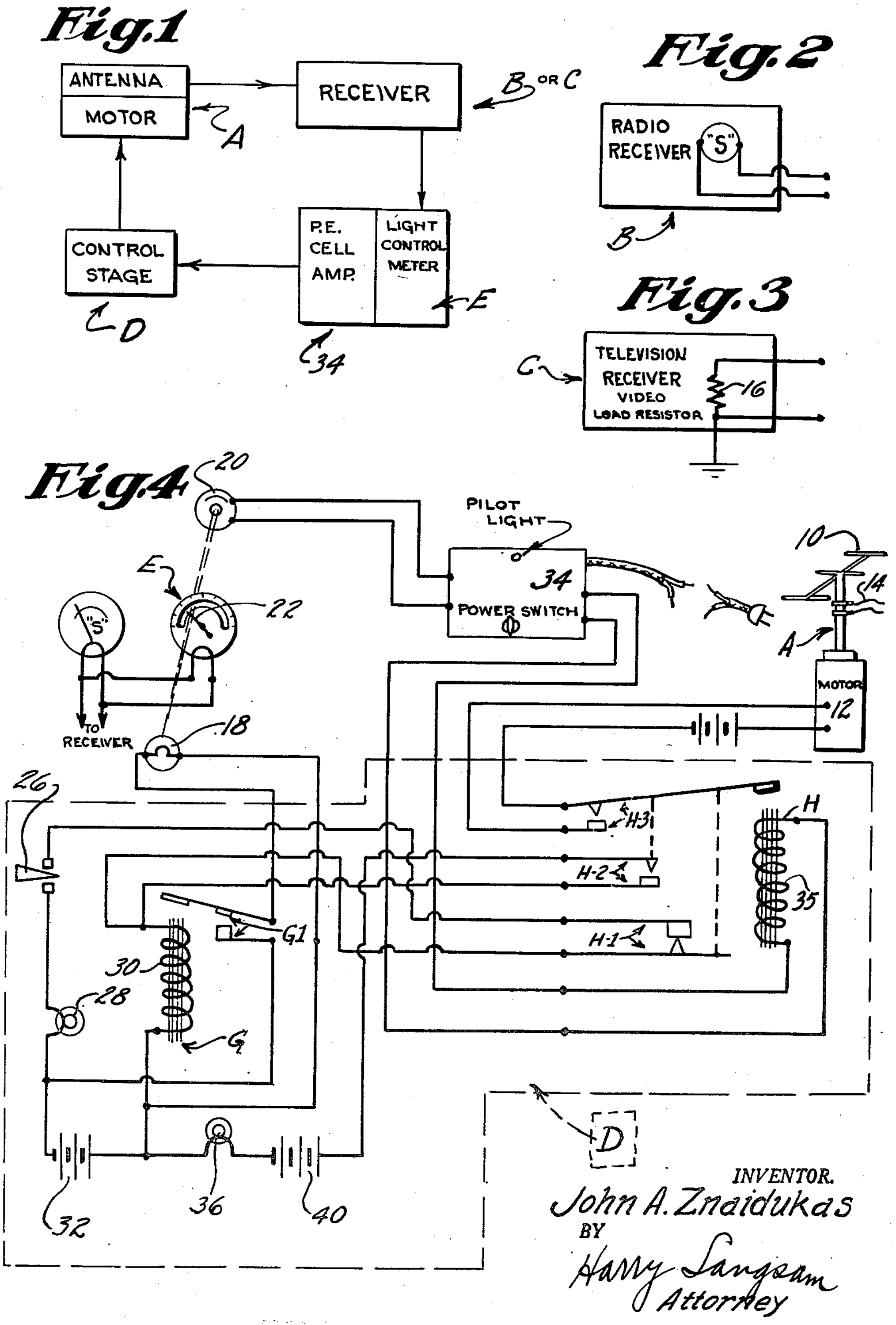
Fig. 1 is a block diagram of a receiving system employing my control.
Fig. 2 is a block diagram of a communications receiver showing the point of connection of the control.
Fig. 3 is a block diagram of a television receiver showing the point of connection of the control.
Fig. 4 is a circuit diagram of the control.

The signals received by the motor-driven antenna, which is generally designated as A, are fed to the television receiver, designated as B, or else to a communications receiver, designated as C. A photo-electric amplifier, generally designated as 34, responds to the signal amplified by the receiver, and in turn, controls the operation of the antenna-rotating motor.

The antenna A comprises a directional array 10 capable of 360 degree rotation, and a motor 12. The antenna-received signal is transmitted by a lead-in cable 14 to the television receiver, where it is amplified, and demodulated in the conventional manner. The output voltage, taken from the video or AVC load resistor 16 or from the "S" meter is conducted to the moving coil 17 of the light control meter E. The meter E is a moving pointer instrument having a lamp 18 mounted on the front for sending a beam of light rearwardly through the instrument upon a photo-cell 20.

The pointer 22 of the meter E carries a shield 24 adapted to interrupt the light beam at a predetermined voltage input to the moving coil 17.

To operate the device, the operator tunes the receiver to the signal and presses the pushbutton 26 shown in Fig. 4.

This energizes relay G through the circuit consisting of the pushbutton 26, the yellow pilot light 28, the low voltage supply 32, the relay coil 30, and the normally-closed contacts H-1 of another relay, H.

Relay G, upon closing, lights the meter lamp 18 through contacts G-1 and the transformer winding 30.

Assuming that the directional antenna is pointing incorrectly, the incoming signal will be weak, and little voltage will be developed across the load resistor 16. The meter E will read low, and the light from the meter lamp 18 will impinge upon the photo-cell 20, setting up a current therein. This current, amplified by a conventional amplifier, 34, energizes the coil 35 of the second relay which is designated as H.

The relay H has three pairs of contacts, designated H-1, H-2, and H-3, respectively, which when the relay operates, perform the following functions:

1. Normally-closed contacts H-1 in circuit with the yellow pilot light 28 now open, extinguishing the yellow light.

2. Normally-open contacts H-2, in circuit with the field coil 30 and a green pilot light 36 and low voltage supply 40 now close, maintaining relay G closed, and therefore keeping the meter lamp 18 lit.

3. Normally-open contacts H-3 now close, furnishing operating current from the power source to the antenna-rotating motor 12.

When the operator sees the green light flash, he releases pushbutton 26. As antenna motor revolves the directional antenna into the best direction for signal reception, the signal voltage increases, and the shield-carrying pointer 22 of the light control meter E moves up the scale. When, at any pre-set value of signal voltage, the shield interrupts the light beam falling upon the photo-cell 20, the coil 35 of relay H opens, stopping the antenna motor so that the antenna remains pointing in the desired direction. The task of the operator is reduced to tuning the station and pressing the pushbutton, and the control D supervises the antenna orientation.

In receiving radio signals, the light-control meter E may be connected to the terminals of the "S" meter, already incorporated in the communications receiver.

Figures 5, 6:
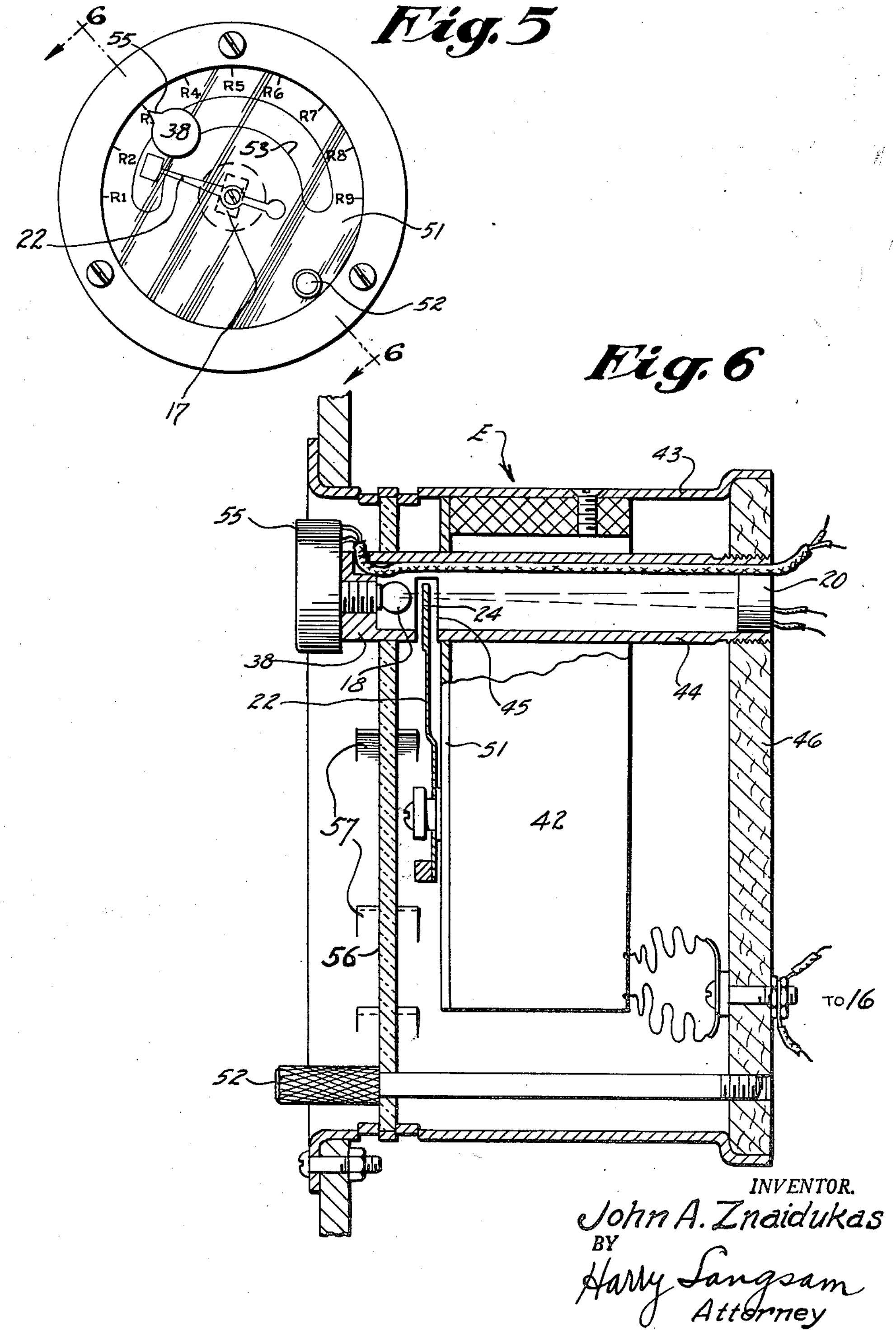
Fig. 5 is a front view of the light control meter.
Fig. 6 is a sectional view of the light control meter taken along line 6—6 of Fig. 5.

The light-control meter E, shown in detail in Figs. 5 and 6 comprises a housing 43 having a sensitive moving coil movement 42. The moving coil 17 is attached to a pointer 22 which carries an arcuate shield 24. A small pre-focussed lamp 18 is mounted in a casing 38. A narrow tube 44 communicates with the rear of the instrument through movable back plate 46. A photo-cell 20 is mounted within the tube 44 so as to receive the light transmitted through the tube.

A slot 45 in tube 44 enables the shield carried by the needle to block the light emitted by bulb 18.

The dial 51 has an arcuate slot 53 to enable the tube 44 to be moved to any point on the dial, as indicated by the index 55 on the tube.

The meter glass 56 is rotatably supported in the housing 43 between two rows of lugs 57 indented from the housing wall. A rod 52 connects the glass 56 with the back plate 46 to facilitate rotation.

The lamp, the tube, 44, and the back plate 46, rotate as a unit over the scale range. Auxiliary markings, such as R5, R7, and R9 on the meter dial 51 indicate the signal levels at which the meter may be adjusted to interrupt the light beam to stop antenna rotation.

Although my invention has been described in considerable detail, such description is intended as being illustrative rather than limiting, since the invention may be variously embodied, and the scope of the invention is to be determined as claimed.

I claim as my invention:

A device for controlling the position of a directional receiving antenna rotated by a motor, in response to the strength of the signal received by the antenna, comprising a meter actuated by said signal, a light source mounted on the meter, a photo-electric cell mounted on the meter opposite the light source, operating means for energizing the motor when the cell is illuminated by the light source, and means in said meter for blocking illumination of the cell at a pre-determined level of signal as read by the meter, including means for varying the signal level at which the illumination of the cell is blocked, wherein said operating means include a relay having three pairs of contacts wherein the first pair of contacts is normally closed to complete the circuit to a pilot light, the second pair of contacts includes normally open contacts to keep the circuit to the meter lamp opened, and to close the circuit when the contacts are closed, and the third pair of contacts which are normally open to control the operating power to the antenna-rotating motor.

JOHN A. ZNAIDUKAS.

REFERENCES CITED

The following references are of record in the file of this patent:

UNITED STATES PATENTS

| Number | Name | Date |
|---|---|---|
| Re. 20,476 | Wilson et al. | Aug. 17, 1937 |
| 2,262,931 | Guanella | Nov. 18, 1941 |
| 2,472,019 | Kinderman | May 31, 1949 |
| 2,505,420 | McCrary et al. | Apr. 25, 1950 |